United States Patent
Akita et al.

(10) Patent No.: US 10,840,844 B2
(45) Date of Patent: Nov. 17, 2020

(54) CONTROLLER FOR ROTARY ELECTRIC MACHINE

(71) Applicant: Mitsubishi Electric Corporation, Tokyo (JP)

(72) Inventors: Kenichi Akita, Tokyo (JP); Masahiko Fujita, Tokyo (JP); Norio Matsumoto, Tokyo (JP); Toshiyuki Yoshizawa, Tokyo (JP); Mitsunori Tabata, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 0 days.

(21) Appl. No.: 16/385,201

(22) Filed: Apr. 16, 2019

(65) Prior Publication Data

US 2019/0372499 A1  Dec. 5, 2019

(30) Foreign Application Priority Data

May 31, 2018  (JP) .................................. 2018-104241

(51) Int. Cl.
  *G01R 31/02*  (2006.01)
  *H02P 23/00*  (2016.01)
  *H02P 27/08*  (2006.01)

(52) U.S. Cl.
  CPC ........ *H02P 23/0027* (2013.01); *H02P 27/085* (2013.01); *H02P 2209/00* (2013.01)

(58) Field of Classification Search
  CPC ...... H02P 27/06; H02P 23/0027; H02P 25/22; H02P 6/15
  See application file for complete search history.

(56) References Cited

U.S. PATENT DOCUMENTS 6,118,186 A * 9/2000 Scott .......................... H02P 9/04
                                                                  290/1 A
2015/0091481 A1   4/2015 Tago et al.

FOREIGN PATENT DOCUMENTS

JP  2004-320861 A  11/2004
JP  2015-073352 A   4/2015

OTHER PUBLICATIONS

Japanese Office Action for Patent Application No. 2018-104241 dated Mar. 12, 2019.

* cited by examiner

*Primary Examiner* — Karen Masih
(74) *Attorney, Agent, or Firm* — Sughrue Mion, PLLC; Richard C. Turner (57) ABSTRACT

To provide a controller for a rotary electric machine capable of suppressing occurrence of an angle interval when the rotary electric machine cannot output torque, even if the ON angle interval of the switching devices is set smaller than 120 degrees in the rectangular wave control. A controller for a rotary electric machine performs a rectangular wave control to a rotary electric machine which has 2 groups of three-phase windings, with a phase difference between groups; and switches a first control mode and a second control mode according to a switching condition; wherein the first control mode is a mode which sets an ON angle interval to an angle within a range from 120 degrees to 180 degrees; and wherein the second control mode is a mode which sets the ON angle interval to an angle within a range from 90 degrees to 120 degrees.

8 Claims, 8 Drawing Sheets

CONTROLLER FOR ROTARY ELECTRIC MACHINE

INCORPORATION BY REFERENCE

The disclosure of Japanese Patent Application No. 2018-104241 filed on May 31, 2018 including its specification, claims and drawings, is incorporated herein by reference in its entirety.

BACKGROUND

The present disclosure relates to a controller for a rotary electric machine which performs rectangular wave control.

In recent years, for the purpose of improvement in fuel efficiency and adaptation to the environmental standard, so-called idling stop vehicle that mounts the rotary electric machine, stops the engine at the stop of vehicle, drives the rotary electric machine at the start of vehicle, and performs the restart and the torque assist of the engine has been developed. Since small size, low cost, and high torque are required for the rotary electric machine used for such a vehicle, the rectangular wave control of 180 degrees which can simplify the controller and attain the high power of the rotary electric machine is used in many cases, as a method which controls on and off of the switching devices. In the rectangular wave control of 180 degrees, the ON angle interval of the switching devices is set to 180 degrees in electrical angle. A higher power of the rotary electric machine is required for the improvement in fuel efficiency, for that purpose, higher capacity and higher voltage of the vehicle power supply device (vehicle battery) are implemented.

However, on the other hand, since the rectangular wave control does not perform feedback control of energizing current to the armature winding at driving, there was anxiety of failure due to current which exceeded the tolerance of the switching devices and heat generation at energization, depending on operating conditions, such as the rotational speed and the power source voltage. Then, as a method to suppress the energizing current at performing the rectangular wave control, the method of performing the rectangular wave control of 120 degrees, in which the energizing current decreases rather than the rectangular wave control of 180 degrees, on the condition where the energizing current becomes excessive has been proposed (for example, refer to JP 2004-320861 A). In the rectangular wave control of 120 degrees, the ON angle interval of the switching devices is set to 120 degrees in electrical angle.

SUMMARY

However, as mentioned above, higher capacity and higher voltage of the vehicle battery are advancing in recent years; when the rectangular wave control is performed, in the low rotation speed region where the energizing time of 1 pulse at performing the rectangular wave control becomes long in particular, only by the conventional technology which reduces the ON angle interval of the switching devices to 120 degrees, the energizing current to the power conversion portion becomes large, and there was still anxiety of causing failure due to heat generation at energization and the like.

In order to reduce the heat generation of the switching devices, it is considered to reduce the ON angle interval of the switching devices less than 120 degrees in electrical angle. However, in the case where the rotary electric machine is provided with only 1 group of three-phase windings as JP 2004-320861 A, if the ON angle interval is reduced less than 120 degrees, intervals when only one of the positive electrode side switching device and the negative electrode side switching device is turned on will occur. In this interval, since current does not flow through winding, the rotary electric machine cannot output torque. For example, when a rotary electric machine stops in this torque output impossible interval, the rotary electric machine cannot output torque, the internal combustion engine cannot be restarted, and the vehicle cannot be started. Also in the state where the rotary electric machine is rotating, torque fluctuation becomes large and there is a possibility of giving a user discomfort.

Thus, it is desirable to provide a controller for a rotary electric machine capable of suppressing occurrence of an angle interval when the rotary electric machine cannot output torque, even if the ON angle interval of the switching devices is set smaller than 120 degrees in electrical angle in the rectangular wave control.

A controller for a rotary electric machine which has 2 groups of three-phase windings according to the present disclosure, the controller for the rotary electric machine including:

an inverter that, for each group of the 2 groups, is provided with 3 sets of a series circuit where a positive electrode side switching device connected to positive electrode side of a DC power source and a negative electrode side switching device connected to negative electrode side of the DC power source are connected in series and where a connection node of series connection is connected to the winding of the corresponding phase, corresponding to respective phases of the three-phase; and a switching control unit that performs, for each group with a phase difference between groups, a rectangular wave control that turns on the positive electrode side switching device and the negative electrode side switching device of each phase respectively once per 360 degrees in electrical angle with a phase difference of 180 degrees in electrical angle mutually, with a phase difference of 120 degrees in electrical angle between phases, wherein the switching control unit switches a first control mode and a second control mode according to a preliminarily set switching condition; wherein the first control mode is a mode which sets an ON angle interval, which is an angle interval turning on the positive electrode side switching device and the negative electrode side switching device, to an angle within a range from 120 degrees to 180 degrees in electrical angle; and wherein the second control mode is a mode which sets the ON angle interval to an angle within a range from 90 degrees to 120 degrees in electrical angle.

According to the controller for the rotary electric machine of the present disclosure, the rectangular wave control can be operated not only in the first control mode of from 120 degrees to 180 degrees in electrical angle which can be performed in the case of providing 1 group of three-phase windings, but also in the second control mode where the ON angle interval is set to an angle within the range from 90 degrees to 120 degrees in electrical angle according to the switching condition, by utilizing that the 2 groups of three-phase windings are provided. Even operating in the second control mode, by providing the phase difference between the first group of rectangular wave control and the second group of rectangular wave control, the torque output impossible interval of the one group can be compensated by the torque output possible interval of the other group, and it is possible to suppress occurrence of angle intervals when the rotary electric machine cannot output torque. Therefore, by switch-

DETAILED DESCRIPTION OF THE EMBODIMENTS

1. Embodiment 1

Figure 1:
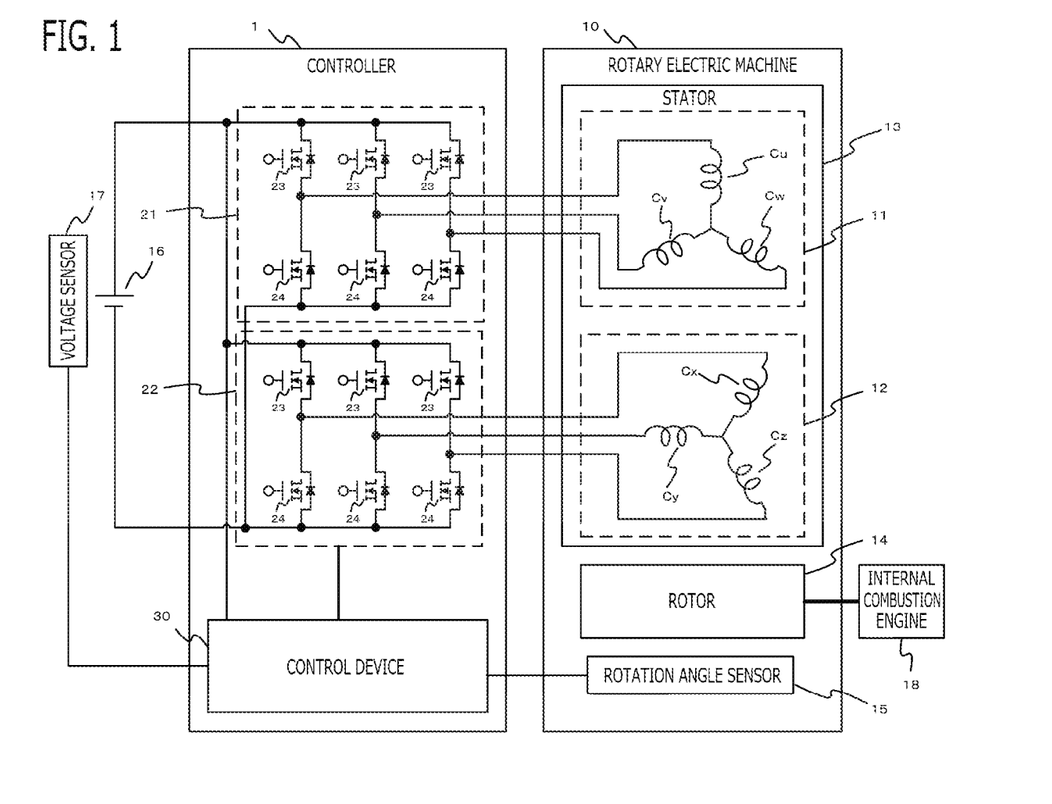
FIG. 1 is a schematic configuration diagram of the rotary electric machine and the controller for the rotary electric machine according to Embodiment 1.

A controller 1 for a rotary electric machine (hereinafter, referred to simply as the controller 1) according to Embodiment 1 will be explained with reference to drawings. FIG. 1 is a schematic configuration diagram of the rotary electric machine 10 and the controller 1 according to the present embodiment.

1-1. Rotary Electric Machine

The rotary electric machine 10 is one rotary electric machine which has 2 groups of three-phase windings 11, 12. The first group of three-phase windings 11 is windings Cu, Cv, Cw of U, V, and W phases, and the second group of three-phase windings 12 is windings Cx, Cy, Cz of X, Y, and Z phases. The first group of three-phase windings 11 and the second group of three-phase windings 12 are wound around the stator 13 with a phase difference $\Delta\theta CL$ in electrical angle. Specifically, there is a winding phase difference $\Delta\theta CL$ in electrical angle between the winding angle of the first group of U phase winding Cu and the winding angle of the second group of X phase winding Cx; there is a winding phase difference $\Delta\theta CL$ in electrical angle between the winding angle of the first group of V phase winding Cv and the winding angle of the second group of Y phase winding Cy; and there is a winding phase difference $\Delta\theta CL$ in electrical angle between the winding angle of the first group of W phase winding Cw and the winding angle of the second group of Z phase winding Cz.

The electromagnet is provided in the rotor 14. Therefore, the 2 groups of three-phase windings 11, 12 are provided in the one stator 13, and the electromagnet is provided in the one rotor 14 which is disposed at the radial-direction inner side of the stator 13. The electrical angle becomes an angle obtained by multiplying the number of pole pairs of the electromagnet to the mechanical angle of the rotor 14. The rotary electric machine 10 is provided with a rotation angle sensor 15, such as a resolver and a rotary encoder, for detecting a rotational angle (magnetic pole position) of the rotor 14. An output signal of the rotation angle sensor 15 is inputted into a control device 30.

1-2. Inverter

The controller 1 is provided with a first group of inverter 21 which converts the DC power of the DC power source 16 and the AC power supplied to the first group of three-phase windings 11, and a second group of inverter 22 which converts the DC power of the DC power source 16 and the AC power supplied to the second group of three-phase windings 12.

Each of the first group and the second group of inverter 21, 22 is provided with three sets of a series circuit where a positive electrode side switching device 23 connected to the positive electrode side of the DC power source 16 and a negative electrode side switching device 24 connected to the negative electrode side of the DC power source 16 are connected in series, corresponding to respective phase of the three-phase windings. A connection node of two switching devices in each series circuit is connected to the winding of the corresponding phase. The inverter is provided with a switching device which turns on and off energization to a field winding of the electromagnet (unillustrated).

MOSFET (Metal Oxide Semiconductor Field Effect Transistor) IGBT (Insulated Gate Bipolar Transistor) in which a diode is connected in reversely parallel, and the like is used for the switching devices. A gate terminal of each switching device is connected to the control device 30 via a gate drive circuit and the like. Therefore, each switching device is turned on or turned off by a gate signal outputted from the control device 30.

An electricity accumulation device, such as a lead battery and a lithium ion battery, is used for the DC power source 16. A DC-DC converter which is a DC electric power converter which steps up or steps down the DC voltage may be provided in the DC power source 16. A voltage sensor 17 for detecting a power source voltage of the DC power source 16 is provided. An output signal of the voltage sensor 17 is inputted into the control device 30.

In the present embodiment, a rotary shaft of the rotor 14 of the rotary electric machine 10 is connected with a crankshaft of an internal combustion engine 18 via a connecting mechanism, such as a belt and a pulley mechanism. The rotary electric machine 10 has a function as a motor to start or assist the internal combustion engine 18, and has a function as a generator which generates electricity using the driving force of the internal combustion engine 18.

1-3. Control Device

Figure 2:
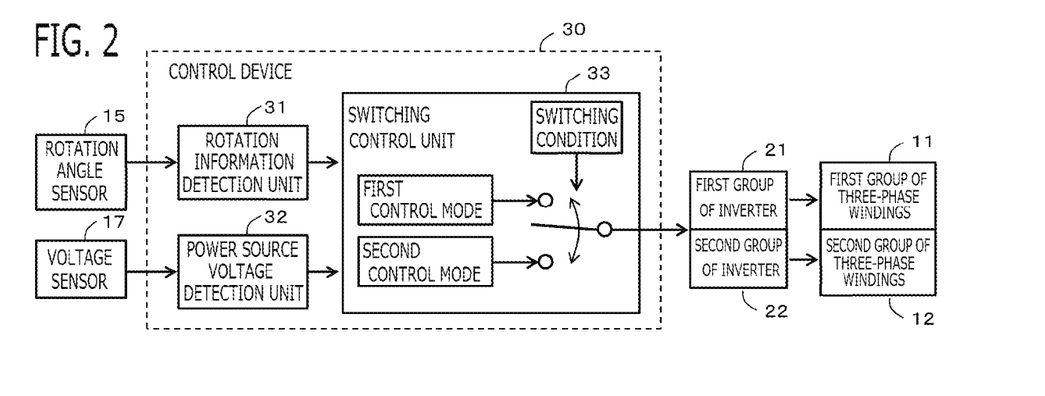
FIG. 2 is a schematic block diagram of the control device according to Embodiment 1.
Figure 3:
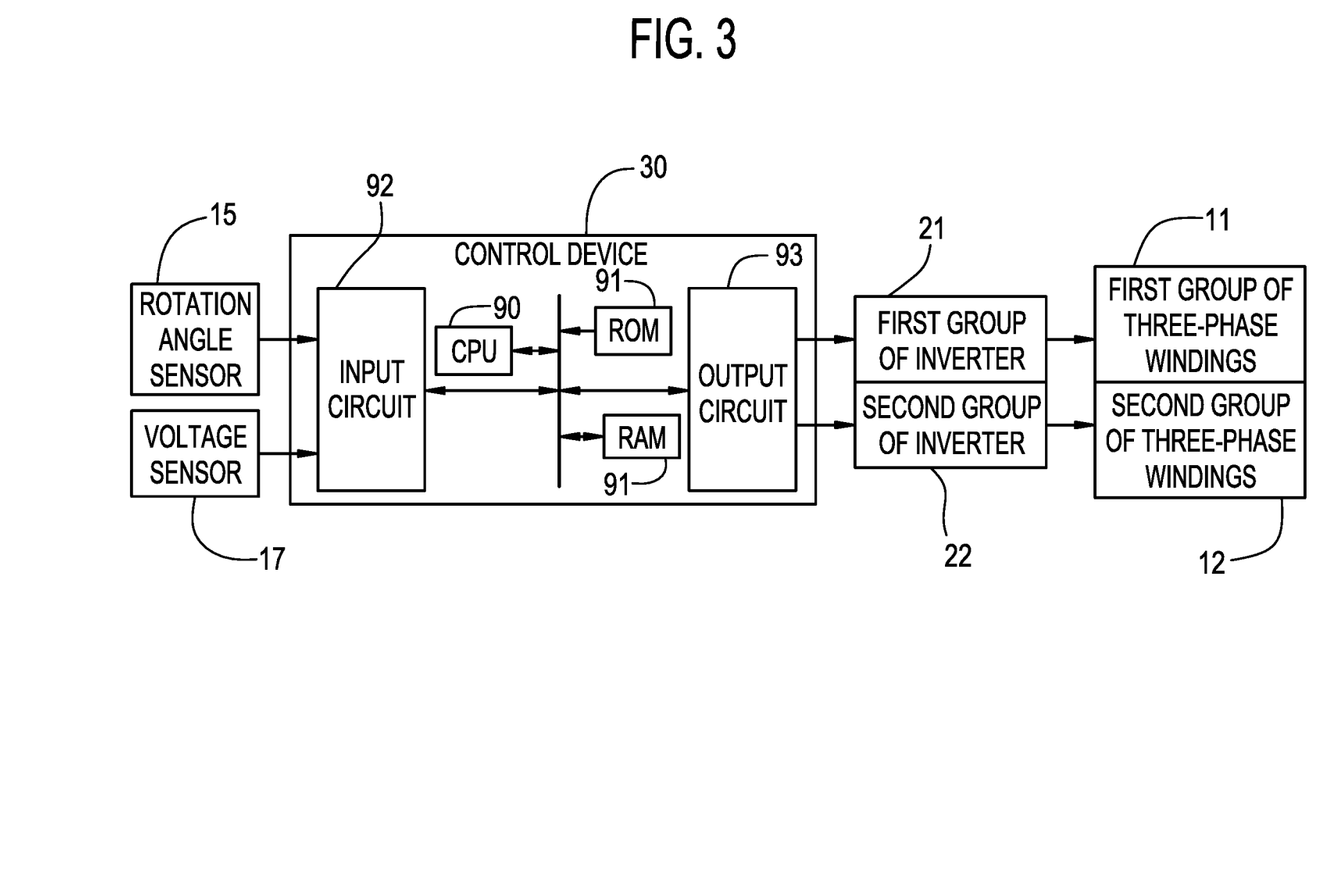
FIG. 3 is a hardware configuration diagram of the control device according to Embodiment 1.

The controller 1 is provided with a control device 30. The control device 30 controls the rotary electric machine 10 via the switching devices of the first group and the second group of inverters 21, 22. The control device 30 is provided with control units, such as a rotation information detection unit 31, a power source voltage detection unit 32, and a switching control unit 33, as shown in FIG. 2. Respective functions of the control device 30 are realized by processing circuits provided in the control device 30. Specifically, as shown in FIG. 3, the control device 30 is provided, as processing circuits, with an arithmetic processor (computer) 90 such as a CPU (Central Processing Unit), storage apparatuses 91 which exchange data with the arithmetic processor 90, an input circuit 92 which inputs external signals to the arithmetic processor 90, an output circuit 93 which outputs signals from the arithmetic processor 90 to the outside, and the like.

As the arithmetic processor 90, ASIC (Application Specific Integrated Circuit), IC (Integrated Circuit), DSP (Digital Signal Processor), FPGA (Field Programmable Gate Array), various kinds of logical circuits, various kinds of signal processing circuits, and the like may be provided. As the arithmetic processor 90, a plurality of the same type ones or the different type ones may be provided, and each processing may be shared and executed. As the storage apparatuses 91, there are provided a RAM (Random Access Memory) which can read data and write data from the arithmetic processor 90, a ROM (Read Only Memory) which can read data from the arithmetic processor 90, and the like. The input circuit 92 is connected with various kinds of sensors and switches such as the rotation angle sensor 15 and the voltage sensor 17, and is provided with an A/D converter and the like for inputting output signals from the sensors and the switches to the arithmetic processor 90. The output circuit 93 is connected with electric loads such as a gate drive circuit which drive on and off of the switching devices of the first group and the second group of inverters 21, 22, and is provided with a driving circuit and the like for outputting a control signal from the arithmetic processor 90.

Then, the arithmetic processor 90 runs software items (programs) stored in the storage apparatus 91 such as a ROM and collaborates with other hardware devices in the control device 30, such as the storage apparatus 91, the input circuit 92, and the output circuit 93, so that the respective functions of the control units 31 through 33 provided in the control device 30 are realized. Setting data items such as an angle setting map to be utilized in the control units 31 through 33 are stored, as part of software items (programs), in the storage apparatus 91 such as a ROM. Each function of the control device 30 will be described in detail below.

1-3-1. Rotation Information Detection Unit 31

The rotation information detection unit 31 detects a rotational angle θ (a magnetic pole position θ) and a rotational speed in electrical angle of the rotor 14. In the present embodiment, the rotation information detection unit 31 detects the rotational angle θ (the magnetic pole position θ) and the rotational speed based on the output signal of the rotation angle sensor 15.

1-3-2. Power Source Voltage Detection Unit 32

The power source voltage detection unit 32 detects a power source voltage of the DC power source 16. In the present embodiment, the power source voltage detection unit 32 detects the power source voltage based on the output signal of the voltage sensor 17.

1-3-3. Switching Control Unit 33

Figure 4:
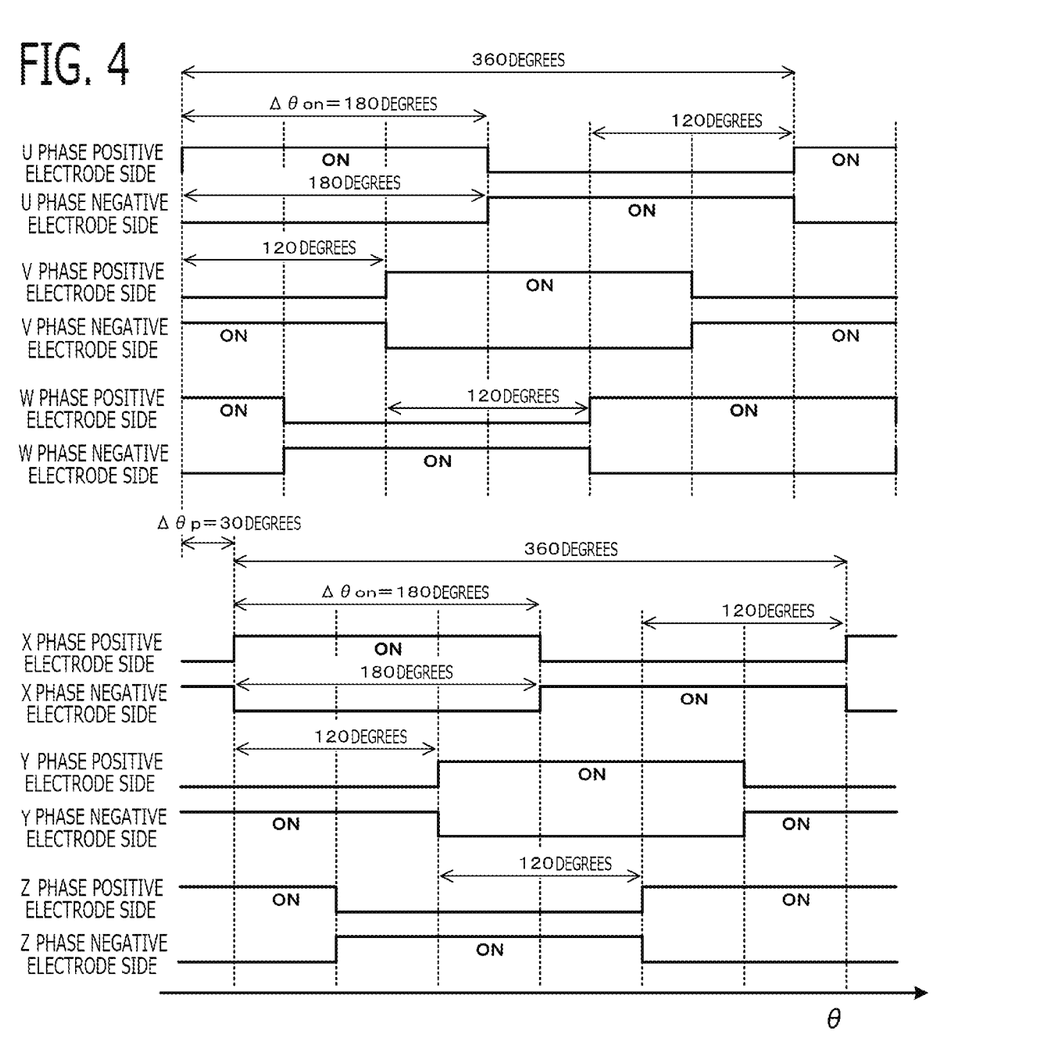
FIG. 4 is a figure showing behavior of the rectangular wave control when the ON angle interval is set to 180 degrees according to Embodiment 1.

The switching control unit 33 performs PWM (Pulse Width Modulation) control which controls on and off of the switching devices for each group. In the present embodiment, as shown in FIG. 4, the switching control unit 33 performs, for each group, a rectangular wave control that turns on the positive electrode side switching device 23 and the negative electrode side switching device 24 of each phase once per 360 degrees respectively in electrical angle with a phase difference of 180 degrees in electrical angle between the positive electrode side switching device 23 and the negative electrode side switching device 24 of each phase, with a phase difference of 120 degrees in electrical angle between phases. For example, about U phase, the phase difference of 180 degrees in electrical angle is set between the ON period of the positive electrode side switching device 23 and the ON period of the negative electrode side switching device 24. The ON period of the positive electrode side switching device 23 of V phase is delayed by the phase difference of 120 degrees in electrical angle to the ON period of the positive electrode side switching device 23 of U phase. The ON period of the positive electrode side switching device 23 of W phase is delayed by the phase difference of 120 degrees in electrical angle to the ON period of the positive electrode side switching device 23 of V phase.

As described later, the switching control unit 33 changes an ON angle interval Δθon which is an angle interval turning on the positive electrode side switching device 23 and the negative electrode side switching device 24. In the example of FIG. 4, the ON angle interval Δθon is set to 180 degrees in electrical angle.

The switching control unit 33, for each group, totally shifts a phase of the ON period of each switching device to the advance angle side or the delay angle side in order to change the output torque. By shifting the phases of all ON periods to the advance angle side or the delay angle side, the magnitude of the output torque of the rotary electric machine 10 can be changed, and not only positive power running torque but also negative regenerative torque can be outputted by the rotary electric machine 10. The phases of all ON periods may not be shifted but may be fixed. The switching control unit 33 changes an ON duty ratio of the switching device which turns on and off energization to the field winding of the electromagnet in order to change the output torque.

The switching control unit 33 performs the rectangular wave control with the phase difference Δθp between groups. For example, as shown in FIG. 4, the phase difference Δθp (in this example, 30 degrees in electrical angle) between groups is set between the ON period of the positive electrode side switching device 23 of U phase of the first group, and the ON period of the positive electrode side switching device 23 of X phase of the second group.

In the present embodiment, the first group of rectangular wave control is performed based on the rotational angle θ on the basis of first group of three-phase windings Cu, Cv, Cw (for example, U phase winding Cu); and the second group of rectangular wave control is performed based on the rotational angle θ on the basis of second group of three-phase windings Cx, Cy, Cz (for example, X phase winding Cx). Accordingly, in the present embodiment, the phase difference Δθp between groups is the same as the winding phase difference ΔθCL (in this example, 30 degrees in electrical angle) (Δθp=ΔθCL=30 degrees). Alternatively, the phase difference Δθp between groups may change from the winding phase difference ΔθCL.

<Problem of Reduction of ON Angle Interval Δθon>

The maximum set value of the ON angle interval Δθon is 180 degrees in electrical angle. This is because if the ON angle interval Δθon is set larger than 180 degrees, the positive electrode side and the negative electrode side switching devices 23, 24 of each phase are turned on at the same time, and a period which the positive electrode side and the negative electrode side of the DC power source 16 are short-circuited occurs.

If the ON angle interval Δθon is large, the ON period of each switching device becomes long, and the heat generation of the switching device becomes large by continuous energization. In particular, the lower the rotational speed becomes, the longer the ON period of the switching device becomes and the larger the heat generation of the switching device becomes even with the same ON angle interval Δθon. The larger the power source voltage becomes, the larger the current value becomes and the larger the heat generation of the switching device becomes even at the same ON angle interval Δθon and the same rotational speed. In order to reduce the heat generation of the switching device, it is considered to reduce the ON angle interval Δθon from 180 degree in electrical angle.

Figure 5:
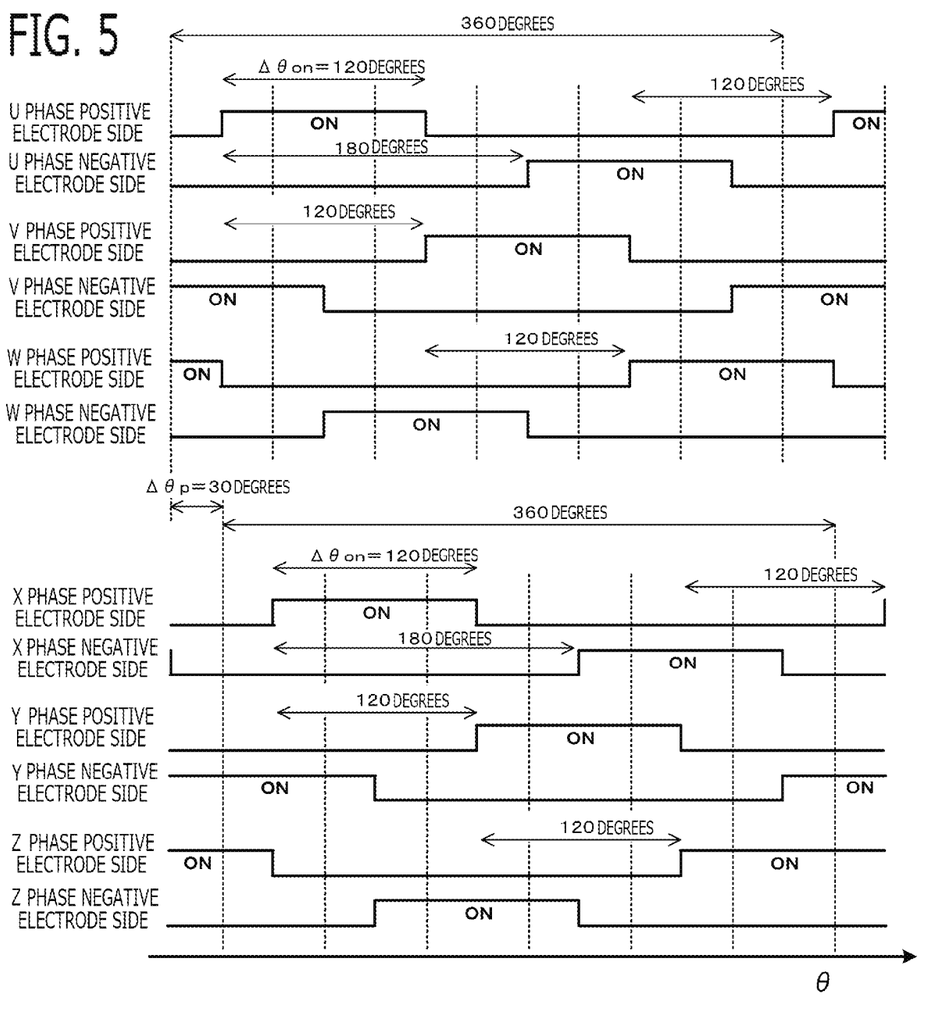
FIG. 5 is a figure showing behavior of the rectangular wave control when the ON angle interval is set to 120 degrees according to Embodiment 1.

As FIG. 5 shows a case where the ON angle interval Δθon is set to 120 degrees in electrical angle, since both of the positive electrode side switching device and the negative electrode side switching device are turned on in all timing of 360 degrees in electrical angle in one group, current can flow through the windings and the rotary electric machine 10 can output torque.

Figure 6:
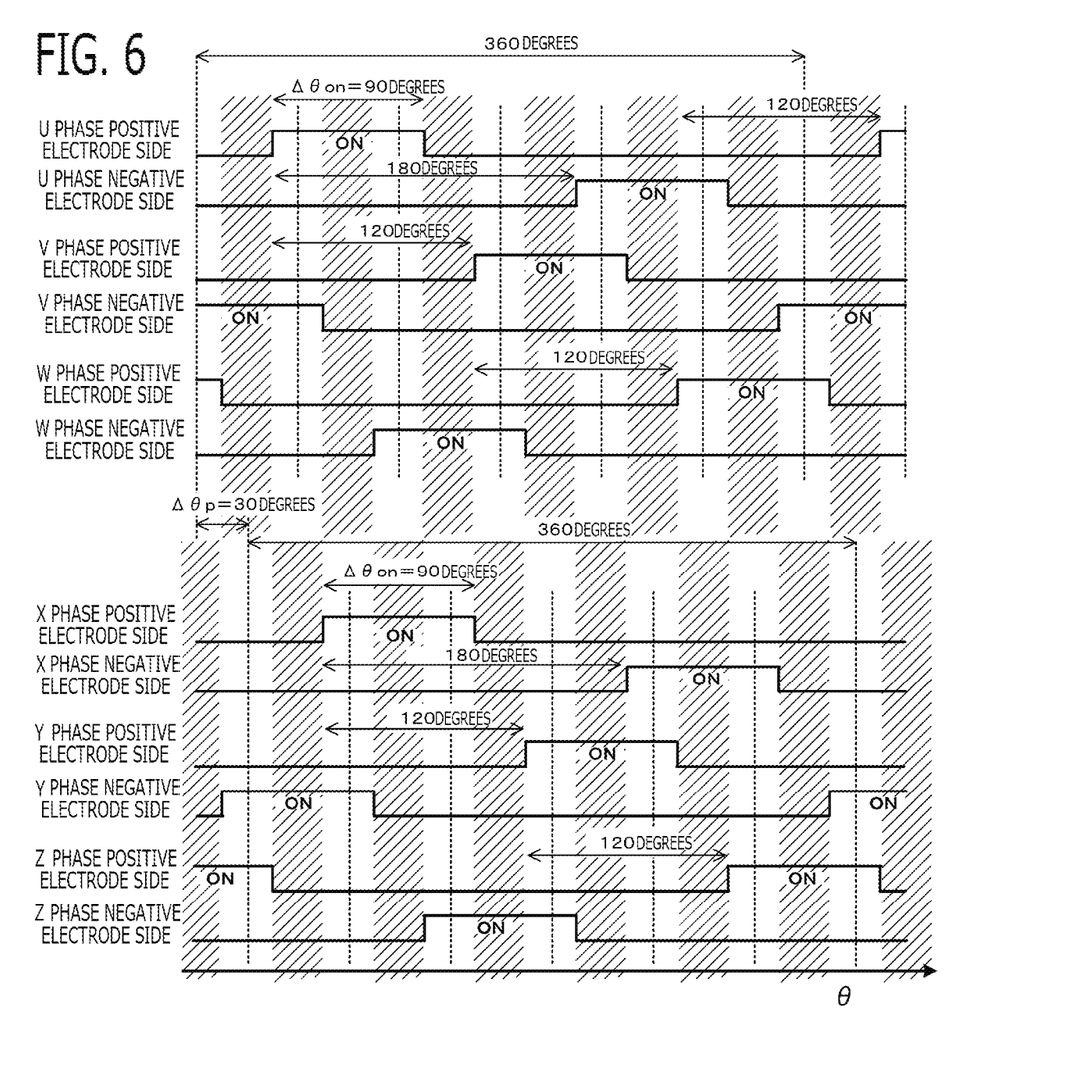
FIG. 6 is a figure showing behavior of the rectangular wave control when the ON angle interval is set to 90 degrees according to Embodiment 1.

However, if the ON angle interval Δθon is set smaller than 120 degrees in electrical angle, as FIG. 6 shows a case where the ON angle interval Δθon is set to 90 degrees in electrical angle, an interval (hatching part in FIG. 6) when only one of the positive electrode side switching device and the negative electrode side switching device is turned on occurs in one group. In this interval, since current does not flow through the windings, the rotary electric machine 10 cannot output torque by the windings of one group. If the rotary electric machine 10 stops in this torque output impossible interval, the rotary electric machine 10 cannot output torque, for example, the internal combustion engine 18 cannot be restarted, and a vehicle cannot be started.

Therefore, with a rotary electric machine which has only 1 group of three-phase windings, as conventional technology, the ON angle interval Δθon could not be set smaller than 120 degrees in electrical angle, and there was a limit in reducing the heat generation of the switching devices.

<Use of 2 Groups of Three-Phase Windings>

As shown in FIG. 6, when the ON angle interval Δθon is 90 degrees in electrical angle, the torque output impossible interval (hatching part) when only one of the positive electrode side and the negative electrode side switching devices is turned on becomes an interval of 30 degrees in electrical angle, the torque output possible interval (non-hatching part) when both of the positive electrode side and the negative electrode side switching devices are turned on becomes an interval of 30 degrees in electrical angle, and both become the same interval. Accordingly, as shown in FIG. 6, by providing a phase difference between the first group of rectangular wave control and the second group of rectangular wave control, the torque output impossible interval of one group can be compensated by the torque output possible interval of the other group. If the ON angle interval Δθon is set to smaller than 90 degrees in electrical angle, the torque output impossible interval becomes longer than the torque output possible interval, and the torque output, impossible interval of one group cannot be compensated enough by the torque output possible interval of the other group. Therefore, the minimum value of the ON angle interval Δθon in the case of providing the 2 groups of three-phase windings becomes 90 degrees in electrical angle.

Then, as shown in a next equation, the switching control unit 33 switches a first control mode and a second control mode according to a preliminarily set switching condition. Wherein the first control mode is a mode which sets the ON angle interval Δθon to an angle within a range from 120 degrees to 180 degrees in electrical angle, and wherein the second control mode is a mode which sets the ON angle interval Δθon to an angle within a range from 90 degrees to 120 degrees in electrical angle.

1) In the case of the first control mode $$120<=\Delta\theta on<=180$$

2) In the case of the second control mode $$90<=\Delta\theta on<120 \quad (1)$$

According to this configuration, the rectangular wave control can be operated not only in the first control mode of from 120 degrees to 180 degrees in electrical angle which can be performed in the case of providing 1 group of three-phase windings, but also in the second control mode where the ON angle interval Δθon is set to an angle within the range from 90 degrees to 120 degrees in electrical angle according to the switching condition, by utilizing that the 2 groups of three-phase windings are provided. Even operating in the second control mode, by providing the phase difference between the first group of rectangular wave control and the second group of rectangular wave control, the torque output impossible interval of the one group can be compensated by the torque output possible interval of the other group, and it is possible to suppress occurrence of an angle interval when the rotary electric machine cannot output torque. Accordingly, even if the rotary electric machine stops at any rotational angle, the rotary electric machine can output torque, and apparatus such as the internal combustion engine and the vehicle can be operated. Therefore, by switching to the second control mode, while suppressing the heat generation of the switching devices, the rotary electric machine can output torque.

Figure 7:
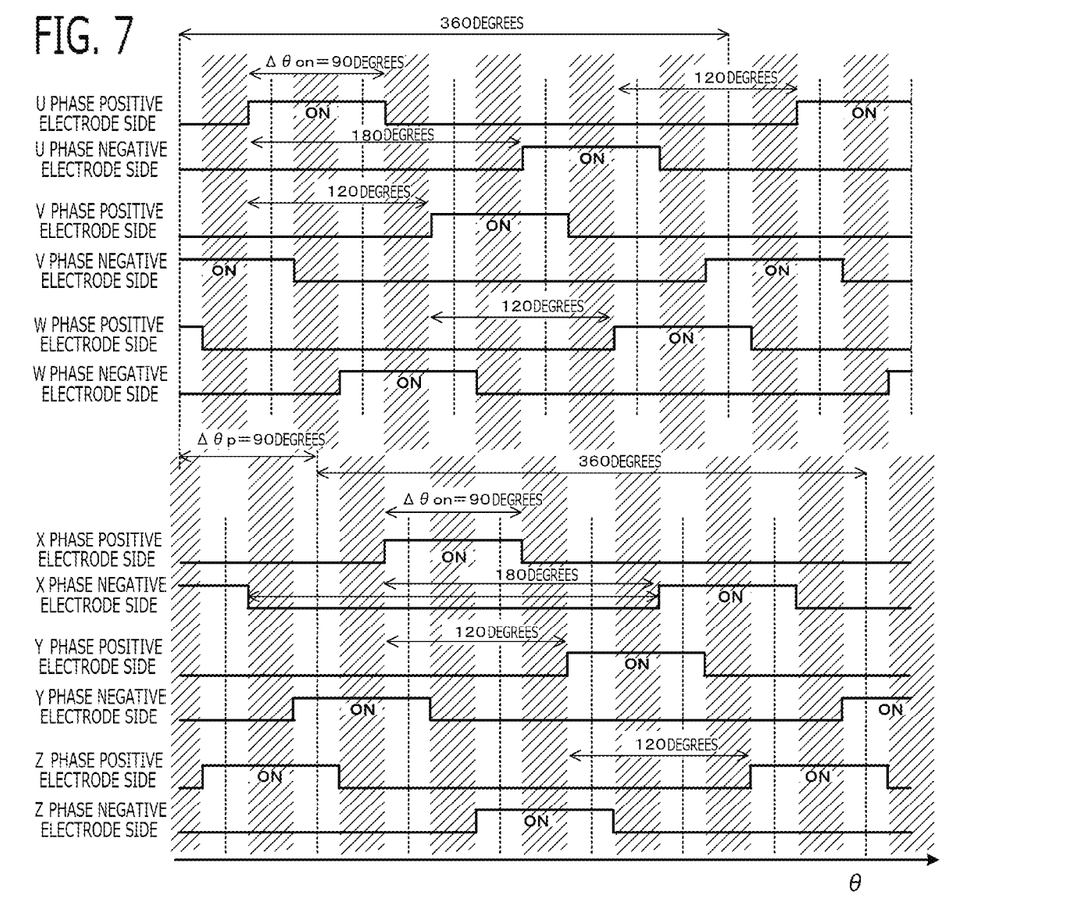
FIG. 7 is a figure showing behavior of the rectangular wave control when the ON angle interval is set to 90 degrees according to Embodiment 1.

In the present embodiment, since the phase difference Δθp between groups is 30 degrees in electrical angle, the torque output impossible interval of one group and the torque output possible interval of the other group can be coincided exactly and can be compensated completely with each other. As shown in FIG. 7, also when the phase difference Δθp between groups is 90 degrees in electrical angle, it can be coincided similarly to the case of 30 degrees. Although the next coincided phase difference Δθp between groups is 150 degrees in electrical angle, since it becomes larger than 120 degrees and the phase is exchanged, it becomes the same as 30 degrees in electrical angle.

<Correspondence to Any Phase Difference Δθp Between Groups>

On the other hand, if the phase difference Δθp between groups deviates from 30 degrees and 90 degrees, the torque output impossible interval of one group and the torque output possible interval of the other group are not coincided exactly, and gaps in which these are not coincided are caused. In order to compensate these gaps, it is necessary to increase the ON angle interval Δθon by a deviation width from 90 degrees. A next equation expresses a minimum ON angle interval Δθonmin (hereinafter, referred to as a lower limit ON angle interval Δθonmin) that does not cause the gaps in which the torque output impossible interval of one group and the torque output possible interval of the other group are not coincided, when the phase difference Δθp between groups deviates from 30 degrees and 90 degrees in electrical angle.

1) In the case of 0<Δθp<60

$$\Delta\theta onmin=90+|\Delta\theta p-30|$$

2) In the case of 60<Δθp<120

$$\Delta\theta onmin=90+|\Delta\theta p-90| \quad (2)$$

Then, in order to correspond to any phase difference $\Delta\theta p$ between groups, as shown in the equation (2) and a next equation, when the phase difference $\Delta\theta p$ between groups is set to an angle within a range from 0 degree to 60 degrees in electrical angle, the switching control unit 33 sets, in the second control mode, the ON angle interval $\Delta\theta on$ to an angle within a range from a lower limit ON angle interval $\Delta\theta onmin$ to 120 degrees. Wherein the lower limit ON angle interval $\Delta\theta onmin$ is obtained by adding an absolute value of a value subtracting 30 degrees from the phase difference $\Delta\theta p$ between groups, to 90 degrees. On the other hand, when the phase difference $\Delta\theta p$ between groups is set to an angle within a range from 60 degrees to 120 degrees in electrical angle, the switching control unit 33 sets, in the second control mode, the ON angle interval $\Delta\theta on$ to an angle within a range from a lower limit ON angle interval $\Delta\theta onmin$ to 120 degrees. Wherein the lower limit ON angle interval $\Delta\theta onmin$ is obtained by adding an absolute value of a value subtracting 90 degrees from the phase difference $\Delta\theta p$ between groups, to 90 degrees.

1) In the case of the first control mode $$120<=\Delta\theta on<=180$$

2) In the case of the second control mode $$\Delta\theta onmin<=\Delta\theta on<120 \quad (3)$$

According to this configuration, in the second control mode, to any phase difference $\Delta\theta p$ between groups, it can suppress causing the gaps in which the torque output possible interval of one group and the torque output impossible interval of the other group are not coincided. Therefore, while suppressing causing the angle interval when the rotary electric machine cannot output torque, it can suppress the heat generation of the switching devices.

Alternatively, as shown in the next equation, in the second control mode, the switching control unit 33 may set the lower limit ON angle interval $\Delta\theta onmin$ calculated by the equation (2), to the ON angle interval $\Delta\theta on$.

1) In the case of the first control mode $$120<=\Delta\theta on<=180$$

2) In the case of the second control mode $$\Delta\theta on=\Delta\theta onmin \quad (4)$$

According to this configuration, in second control mode, while suppressing causing the angle interval when the rotary electric machine cannot output torque, it can maximally suppress the heat generation of the switching devices.

<Switching Condition>

In the present embodiment, the switching control unit 33 switches the first control mode and the second control mode according to the rotational speed of the rotary electric machine and the power source voltage of the DC power source as the switching condition.

Figure 8:
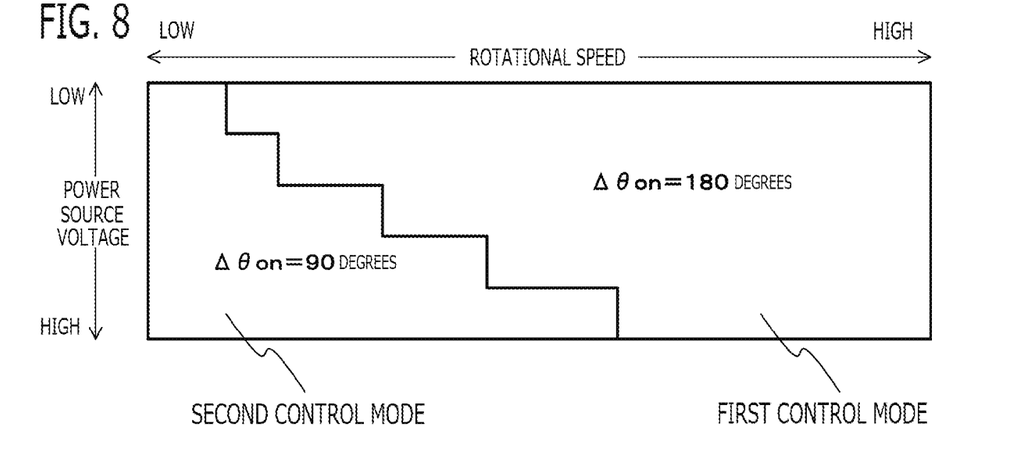
FIG. 8 is a figure explaining the angle setting map according to Embodiment 1.

For example, the switching control unit 33 calculates the ON angle interval $\Delta\theta on$ corresponding to the present rotational speed and the present power source voltage, by referring to an angle setting map in which the relationship among the rotational speed, the power source voltage, and the ON angle interval $\Delta\theta on$ is preliminarily set as shown in FIG. 8. In the example shown in FIG. 8, in a region where the rotational speed is lower than the boundary value, $\Delta\theta on$ is set to 90 degrees, and it switches to the second control mode; and in a region higher than the boundary value, $\Delta\theta on$ is set to 180 degrees, and it switches to the first control mode. As the power source voltage becomes higher, the boundary value shifts to the high speed side, and the rotational speed region where $\Delta\theta on$ is set to 90 degrees expands to the high speed side.

In this way, since, in the region of low rotational speed and high power source voltage where the heat generation of the switching devices becomes high, $\Delta\theta on$ is set to 90 degrees and it switches to the second control mode, the heat generation of the switching devices can be reduced.

Figure 9:
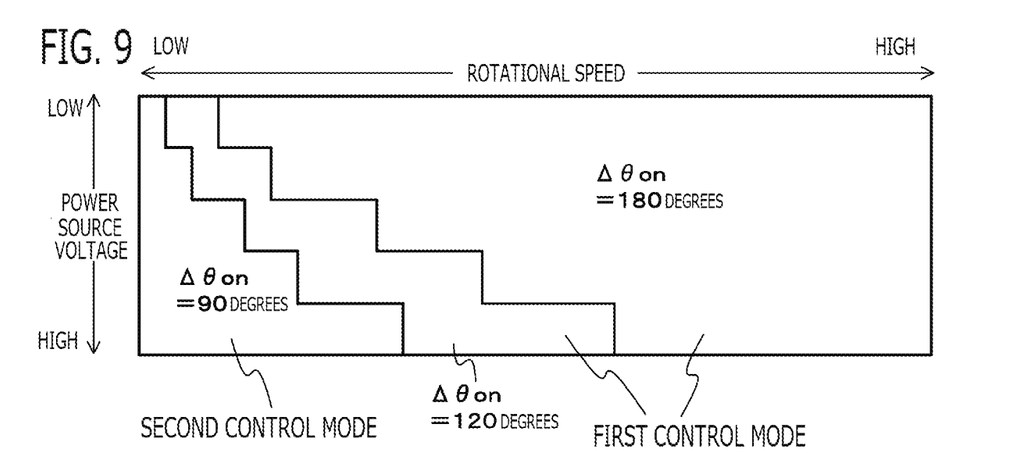
FIG. 9 is a figure explaining the angle setting map according to Embodiment 1.

Alternatively, the angle setting map may be set as shown in FIG. 9. In the case of this example, the set region of $\Delta\theta on=120$ degrees (the first control mode) is provided between the set region of $\Delta\theta on=90$ degrees and the set region of $\Delta\theta on=180$ degrees. In this way, according to the necessity for reduction of the heat generation of the switching devices, the ON angle interval $\Delta\theta on$ may be gradually decreased even in the same control mode.

The switching control unit 33 may change the ON angle interval $\Delta\theta on$ gradually, when changing the ON angle interval $\Delta\theta on$. For example, when the ON angle interval $\Delta\theta on$ which was calculated by referring to the angle setting map of FIG. 8 changes from 90 degrees to 180 degrees, the time change rate of the ON angle interval $\Delta\theta on$ is limited, and the ON angle interval $\Delta\theta on$ which is finally set is gradually changed from 90 degrees to 180 degrees. According to this configuration, a rapid change of the energizing current and torque at switching can be suppressed.

2. Embodiment 2

Figure 10:
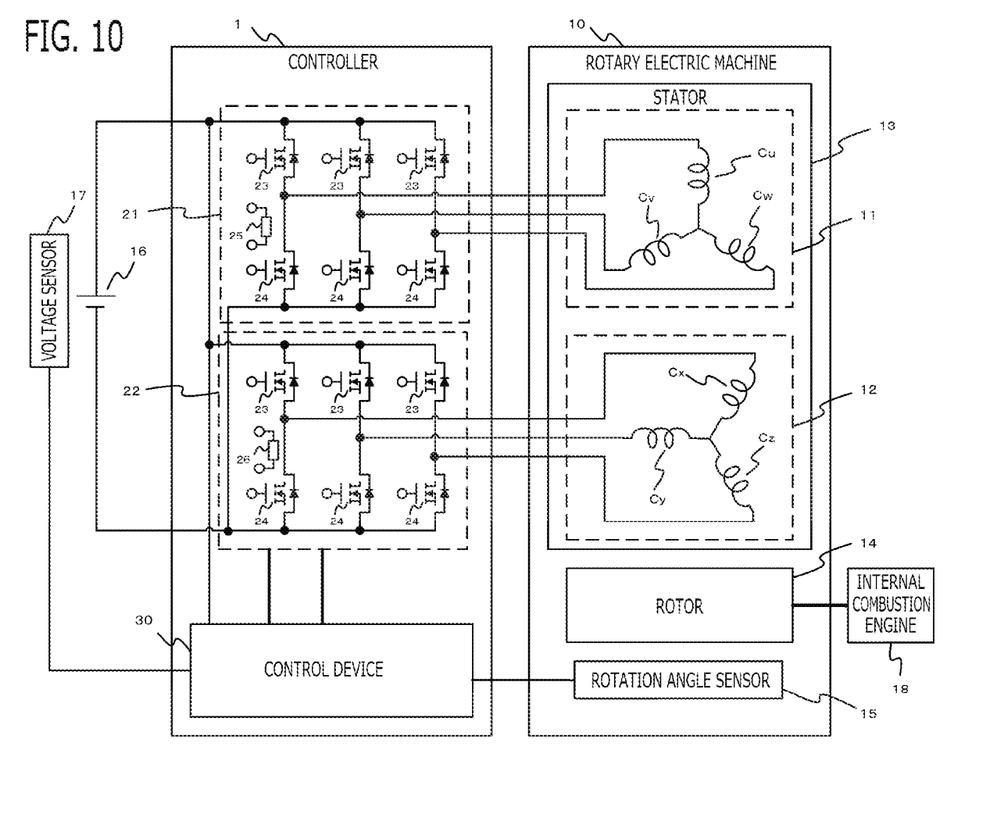
FIG. 10 is a schematic configuration diagram of the rotary electric machine and the controller for the rotary electric machine according to Embodiment 2.
Figure 11:
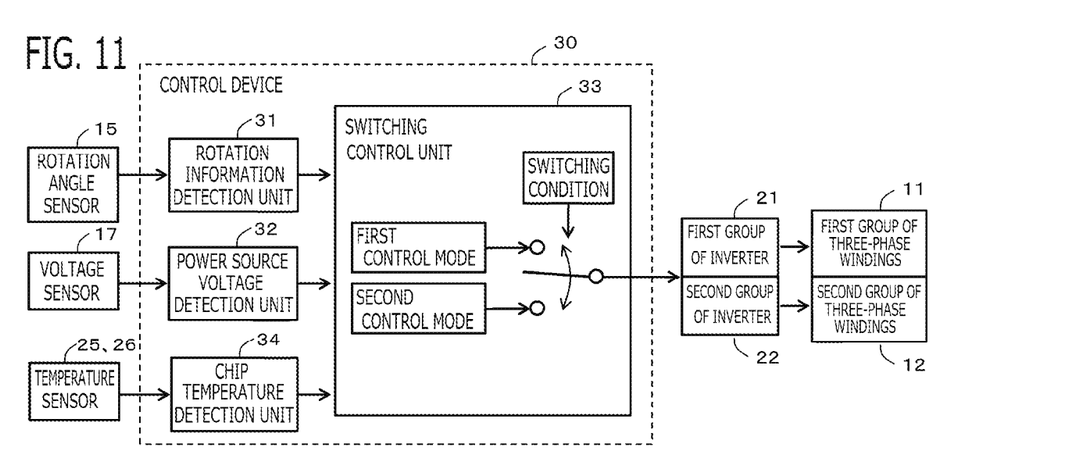
FIG. 11 is a schematic block diagram of the control device according to Embodiment 2.

Next, the controller 1 for the rotary electric machine according to Embodiment 2 will be explained. The explanation for constituent parts the same as those in Embodiment 1 will be omitted. In the present embodiment, it is configured to detect the temperature of the switching device, and the switching condition which switches the first control mode and the second control mode is different from Embodiment 1. FIG. 10 is a schematic configuration diagram of the rotary electric machine 10 and the controller 1 according to the present embodiment. FIG. 11 is a block diagram of the control device 30 according to the present embodiment.

In the present embodiment, as shown in FIG. 10, each of the first group and the second group of inverters 21, 22 is provided with the temperature sensor 25, 26 for detecting the temperature of the switching device, respectively. Each temperature sensor 25, 26 is arranged close to the switching device, and can detect the temperature of the switching device. The temperature sensor 25, 26 may be provided one by one for each phase of three phases, or the temperature sensor 25, 26 may be provided one for only any one phase of three phases. An output signal of each temperature sensor 25, 26 is inputted into the control device 30.

The control device 30 is further provided with a chip temperature detection unit 34 which detects the temperature of the switching device, as shown in FIG. 11. The chip temperature detection unit 34 detects the temperature of the switching device based on the output signal of each temperature sensor 25, 26.

The switching control unit 33 switches the first control mode and the second control mode according to the temperature of the switching device as the switching condition. Specifically, when the temperature of the switching device is lower than a preliminarily set switching determination value, the switching control unit 33 performs the first control mode which sets the ON angle interval aeon to an angle (for example, 180 degrees) within a range from 120 degrees to 180 degrees in electrical angle. When the temperature of the switching device is higher than or equal to the switching determination value, the switching control unit 33 performs the second control mode which sets the ON angle interval $\Delta\theta$on to an angle (for example, 90 degrees) within a range from 90 degrees to 120 degrees in electrical angle. The switching control unit 33 may use a maximum value or an average value of temperatures of a plurality of switching devices which were detected by the respective temperature sensors 25, 26.

According to this configuration, when the temperature of the switching device becomes high, it is switched to the second control mode, a temperature rise of the switching device can be suppressed, and failure of the switching device due to overheating can be suppressed.

Other Embodiments

Lastly, other embodiments of the present disclosure will be explained. Each of the configurations of embodiments to be explained below is not limited to be separately utilized but can be utilized in combination with the configurations of other embodiments as long as no discrepancy occurs.

(1) In each of the above-mentioned Embodiments, there has been explained the case where the electromagnet is provided in the rotor 14. However, embodiments of the present disclosure are not limited to the foregoing case. That is to say, a permanent magnet may be provided in the rotor 14, or a squirrel-cage type electric conductor may be provided in the rotor 14.

(2) In each of the above-mentioned Embodiments, there has been explained the case where the ON angle interval $\Delta\theta$on in the second control mode is set to 90 degrees. However, embodiments of the present disclosure are not limited to the foregoing case. That is, the ON angle interval $\Delta\theta$on in the second control mode may be set to an angle within the range from 90 degrees to 120 degrees in electrical angle, for example, 100 degrees, 110 degrees, or the lower limit ON angle interval $\Delta\theta$onmin.

(3) In each of the above-mentioned Embodiments, there has been explained the case where the phase difference $\Delta\theta$p between groups is set to 30 degrees in electrical angle. However, embodiments of the present disclosure are not limited to the foregoing case. That is to say, the phase difference $\Delta\theta$p between groups may be set to angles other than 30 degrees. In this case, as mentioned above, the ON angle interval $\Delta\theta$on of the second control mode may be set according to the equation (2) to (4).

(4) There has been explained the case where in the Embodiment 1, the first control mode and the second control mode are switched according to the rotational speed and the power source voltage as the switching condition; and in the Embodiment 2, the first control mode and the second control mode are switched according to the temperature of the switching device as the switching condition. However, embodiments of the present disclosure are not limited to the foregoing case. That is to say, the switching condition of the rotational speed and the power source voltage and the switching condition of the temperature of the switching device may be combined. For example, the switching control unit 33 determines, as a base determination, to switch to any of the first control mode and the second control mode according to the rotational speed and the power source voltage; and even though the result of base determination is switching to the first control mode, when the temperature of the switching device is higher than the switching determination value, the switching control unit 33 finally determines to switch to the second control mode.

Although the present disclosure is described above in terms of various exemplary embodiments and implementations, it should be understood that the various features, aspects and functionality described in one or more of the individual embodiments are not limited in their applicability to the particular embodiment with which they are described, but instead can be applied, alone or in various combinations to one or more of the embodiments. It is therefore understood that numerous modifications which have not been exemplified can be devised without departing from the scope of the present disclosure. For example, at least one of the constituent components may be modified, added, or eliminated. At least one of the constituent components mentioned in at least one of the preferred embodiments may be selected and combined with the constituent components mentioned in another preferred embodiment.

What is claimed is:

1. A controller for a rotary electric machine which has 2 groups of three-phase windings, the controller for the rotary electric machine comprising:

an inverter that, for each group of the 2 groups, is provided with 3 sets of a series circuit where a positive electrode side switching device connected to positive electrode side of a DC power source and a negative electrode side switching device connected to negative electrode side of the DC power source are connected in series and where a connection node of series connection is connected to the winding of the corresponding phase, corresponding to respective phases of the three-phase; and a switching controller that, for each group with a phase difference between groups, performs a rectangular wave control that turns on the positive electrode side switching device and the negative electrode side switching device of each phase once per 360 degrees in electrical angle respectively with a phase difference of 180 degrees in electrical angle between the positive electrode side and the negative electrode side, with a phase difference of 120 degrees in electrical angle between phases, wherein the switching controller switches a first control mode and a second control mode according to a preliminarily set switching condition; wherein the first control mode is a mode which sets an ON angle interval, which is an angle interval turning on the positive electrode side switching device and the negative electrode side switching device, to an angle within a range from 120 degrees to 180 degrees in electrical angle; and wherein the second control mode is a mode which sets the ON angle interval to an angle within a range from 90 degrees to 120 degrees in electrical angle.

2. The controller for the rotary electric machine according to claim 1, wherein when the phase difference between groups of the rectangular wave control is set to an angle within a range from 0 degree to 60 degrees in electrical angle, the switching controller, in the second control mode, sets the ON angle interval to an angle within a range from a lower limit ON angle interval to 120 degrees, wherein the lower limit ON angle interval is obtained by adding an absolute value of a value subtracting 30 degrees from the phase difference between groups, to 90 degrees; and when the phase difference between groups is set to an angle within a range from 60 degrees to 120 degrees in electrical angle, the switching controller, in the second control mode, sets the ON angle interval to an angle within a range from a lower limit ON angle interval to 120 degrees, wherein the lower limit ON angle interval is obtained by adding an absolute value of a value subtracting 90 degrees from the phase difference between groups, to 90 degrees.

3. The controller for the rotary electric machine according to claim 1, wherein when the phase difference between groups is set to an angle within a range from 0 degrees to 60 degrees in electrical angle, the switching controller, in the second control mode, sets the ON angle interval to a lower limit ON angle interval, wherein the lower limit ON angle interval is obtained by adding an absolute value of a value subtracting 30 degrees from the phase difference between groups, to 90 degrees; and when the phase difference between groups is set to an angle within a range from 60 degrees to 120 degrees in electrical angle, the switching controller, in the second control mode, sets the ON angle interval to a lower limit ON angle interval, wherein the lower limit ON angle interval is obtained by adding an absolute value of a value subtracting 90 degrees from the phase difference between groups, to 90 degrees.

4. The controller for the rotary electric machine according to claim 1, wherein the switching controller sets the phase difference between groups to 30 degrees or 90 degrees in electrical angle, and sets the ON angle interval to 90 degrees in electrical angle in the second control mode.

5. The controller for the rotary electric machine according to claim 1, wherein the phase difference between groups of the rectangular wave control is set to the phase difference between groups of the three-phase windings.

6. The controller for the rotary electric machine according to claim 1, wherein the switching controller switches the first control mode and the second control mode according to a rotational speed of the rotary electric machine and a power source voltage of the DC power source as the switching condition.

7. The controller for the rotary electric machine according to claim 1, further comprising a chip temperature detector that detects a temperature of the switching device, wherein the switching controller switches the first control mode and the second control mode according to the temperature of the switching device as the switching condition.

8. The controller for the rotary electric machine according claim 1, wherein the switching controller changes the ON angle interval gradually, when changing the ON angle interval.

* * * * *